(12) United States Patent
Diochon et al.

(10) Patent No.: US 8,459,588 B2
(45) Date of Patent: Jun. 11, 2013

(54) ATTACHMENT PYLON FOR AN AIRCRAFT TURBO-SHAFT ENGINE WITH CONCENTRIC HOT AIR CHANNELS

(75) Inventors: Lionel Diochon, Toulouse (FR); Yann Murer, Saint Jean (FR)

(73) Assignee: Airbus Operations S.A.S., Toulouse (FR)

( * ) Notice: Subject to any disclaimer, the term of this patent is extended or adjusted under 35 U.S.C. 154(b) by 346 days.

(21) Appl. No.: 12/892,374

(22) Filed: Sep. 28, 2010

(65) Prior Publication Data
US 2011/0108662 A1 May 12, 2011

(30) Foreign Application Priority Data
Oct. 15, 2009 (FR) ...................................... 09 57239

(51) Int. Cl.
*B64D 15/04* (2006.01)
*B64D 27/26* (2006.01)
*F16L 41/00* (2006.01)

(52) U.S. Cl.
USPC ....................... 244/54; 244/134 B; 137/561 A

(58) Field of Classification Search
USPC ...... 244/55, 56, 134 R, 134 B; 248/554–557; 60/796, 797; 137/561 A
See application file for complete search history.

(56) References Cited

U.S. PATENT DOCUMENTS

| | | | | |
|---|---|---|---|---|
| 2,393,792 | A * | 1/1946 | McCollum | 126/110 R |
| 4,757,963 | A * | 7/1988 | Cole | 244/134 B |
| 4,783,026 | A * | 11/1988 | Rumford et al. | 244/134 R |
| 4,976,396 | A * | 12/1990 | Carlson et al. | 244/55 |
| 5,011,098 | A * | 4/1991 | McLaren et al. | 244/134 B |
| 5,841,079 | A * | 11/1998 | Parente | 181/214 |
| 6,592,078 | B2 * | 7/2003 | Porte et al. | 244/134 B |
| 6,698,691 | B2 * | 3/2004 | Porte | 244/134 B |
| 7,975,966 | B2 * | 7/2011 | De Souza et al. | 244/134 B |
| 2002/0139899 | A1 * | 10/2002 | Porte | 244/134 B |
| 2003/0150955 | A1 | 8/2003 | Daggett | |

FOREIGN PATENT DOCUMENTS

| | | |
|---|---|---|
| EP | 0 376 371 A2 | 7/1990 |
| GB | 485395 | 5/1938 |

OTHER PUBLICATIONS

Preliminary French Search Report issud May 17, 2010, in Application No. FR 0957239 FA 726874.

* cited by examiner

*Primary Examiner* — Joseph W Sanderson
(74) *Attorney, Agent, or Firm* — Oblon, Spivak, McClelland, Maier & Neustadt, L.L.P.

(57) ABSTRACT

A pylon for attaching a turbo-shaft aircraft engine designed to be laterally offset on a rear part of the aircraft structure, where the pylon possesses an aerodynamic profile which includes a leading edge, as well as a first hot air distribution channel passing along the leading edge in order to provide anti-icing, where this engine attachment pylon includes moreover a second hot air channel belonging to a system for supplying pressurized air to the aircraft. The second channel is housed inside the first channel.

8 Claims, 2 Drawing Sheets

ATTACHMENT PYLON FOR AN AIRCRAFT TURBO-SHAFT ENGINE WITH CONCENTRIC HOT AIR CHANNELS

BACKGROUND OF THE INVENTION

1. Field of the Invention

This invention relates in general to an engine assembly for an aircraft, of the type designed to be installed laterally on a rear part of the aircraft structure and which incorporates a turbo-shaft engine, for example of the turbojet or turbo-prop type.

2. Discussion of the Background

Such an engine assembly includes an attachment pylon designed to provide the interface between the turbo-shaft engine and the rear part of the fuselage, where this pylon usually forms an aerodynamic profile whose leading edge is equipped with anti-icing means. These means draw off hot air at the turbo-shaft engine that is then blown towards the internal surface of the leading edge through a hot air distribution channel running along this leading edge in order to provide anti-icing of the latter. This principle is also referred to as an "anti-icing" effect.

In addition, the rear part of the aircraft also includes system for supplying pressurised air, which incorporates a channel for hot air also generally drawn off the turbo-shaft engine. This channel usually leads through the engine attachment pylon, away from the means used for anti-icing, to be connected to a heat-exchanger also fed by cold air drawn from the exterior of the aircraft.

The multiplicity of the number of these channels only accentuates the recurrent problems of space occupied within the engine attachment pylon, a part of the aircraft that is in fact crossed by a multitude of items of equipment. Furthermore, this confinement within the pylon creates a heat-risk zone in the event of one of the channels rupturing, or in the event of a hot air leak.

SUMMARY OF THE INVENTION

The purpose of the invention is therefore to propose an engine attachment pylon which remedies, at least in part, the above mentioned disadvantage associated with embodiments of the prior art.

To achieve this, the object of the invention is a pylon for attaching an aircraft turbo-shaft engine designed to be laterally offset on a rear part of the aircraft structure, where said pylon exhibits an aerodynamic profile which includes a leading edge, as well as a first hot-air distribution channel which passes along the leading edge in order to provide anti-icing of the latter, where said attachment pylon includes in addition a second hot air channel belonging to a system for supplying pressurised air for the aircraft. According to the invention the said second channel is housed inside the said first channel.

By placing the two channels one inside the other rather than in an adjacent manner, the occupied space associated with their presence is greatly reduced, and consequently space is freed up for other equipment to pass through the engine attachment pylon. In addition, within the engine attachment pylon, the heat-risk zone associated with the presence of hot air channels is less extensive.

Furthermore, by fitting these two channels one inside the other, the heat losses experienced by the hot air passing through the channels are appreciably reduced.

The first and second channels are each preferably cylindrical with circular cross-sections and are concentric, although other shapes can be adopted whilst still remaining within the scope of the invention.

The first channel for distribution of hot air preferably has multiple hot air distribution holes made in it, preferably arranged facing the leading edge.

The first and second channels are each preferably fed by hot air drawn off the turbo-shaft engine.

The first and second channels are preferably respectively fed by first and second pipes which emerge from the same channel which draws hot air off the engine. In such a case, means of controlling the apportionment of hot air flowing through the first and second pipes are preferably envisaged.

Another object of the invention is also an aircraft engine assembly which includes a turbo-shaft engine as well as an engine attachment pylon as described above which carries the said turbo-shaft engine and which is designed to be laterally offset on a rear part of the aircraft structure.

The turbo-shaft engine of the assembly may be a turbojet engine or a turbo-prop engine with a single propeller or two contra-rotating propellers, for example of the "open rotor" type.

Furthermore, the invention relates to a rear part of the aircraft which includes at least one engine assembly as described above, laterally offset on the fuselage of the aircraft.

Finally, one object of the invention is an aircraft which includes a rear part as described above.

Other advantages and characteristics of the invention will appear in the detailed non-restrictive description below.

BRIEF DESCRIPTION OF THE DRAWINGS

This description will be made in relation to the appended drawings, in which.

DETAILED DESCRIPTION OF THE PREFERRED EMBODIMENTS

Figure 1:
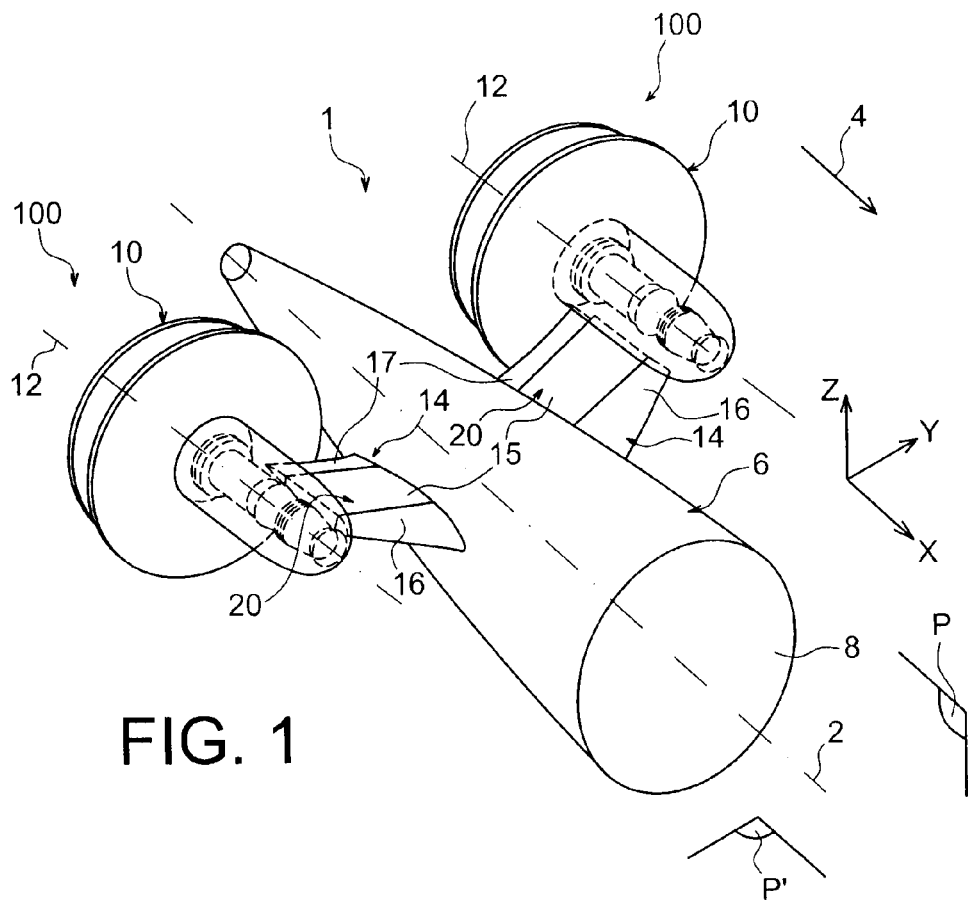
FIG. 1 shows a perspective view of a rear part of an aircraft, which incorporates an engine assembly which is in accordance with one preferred embodiment of this invention.

With reference to FIG. 1, a rear part of the aircraft can be seen which is in the form of a preferred embodiment of this invention.

Throughout the entire description that follows, by convention the longitudinal direction of the aircraft, which is parallel to a longitudinal axis of this aircraft, is called X. Moreover, the direction which is aligned transversely in relation to the aircraft is called Y, and the vertical direction or height is Z, with these three directions X, Y and Z being orthogonal to each other.

Moreover, the terms "forward" and "rear" are to be regarded in relation to a direction of forward motion of the aircraft experienced as a result of the thrust exerted by the engines, with this direction being schematically represented by arrow 4.

Overall, the rear part 1 includes a fuselage 6 with an approximately circular, elliptical or similar transverse section, whose centre passes through the longitudinal axis 2 and which delimits an internal space of the aircraft 8.

In addition, it includes two engine assemblies 100, arranged on either side of a vertical median plane P passing through the axis 2, where each assembly 100 includes a turbo-shaft engine 10 with propellers, preferably a turbo-prop engine of the "open rotor" type which includes a pair of contra-rotating propellers. Each of these has a longitudinal axis 12 which is approximately parallel to the direction X. Moreover, each engine assembly 100 is arranged laterally in relation to the fuselage 6, it being specified as regards to this that an angle may be envisaged between the median horizontal plane P' of the aircraft and the plane passing through the longitudinal axes 2, 12 of the turbo-shaft engine and of the aircraft. Typically, this angle may be between 10 and 35°. In any event, each engine assembly 100 is laterally offset on the structure of the aircraft, more precisely on a rear part of the latter, on the fuselage 6 behind the main wing.

An engine attachment pylon 14 is envisaged for suspending the turbo-shaft engine of each assembly, where this includes a rigid structure 15, also called the primary structure, through which the forces produced by the engine 10 are transmitted, where the rigid structure is covered by aerodynamic fairings, in particular a front fairing 16 which forms a leading edge. Analogously, a rear fairing 17 is envisaged which forms a trailing edge of the pylon.

In a conventional manner, the pylon 14 has means of fixing (not shown) interposed between the engine 10 and the rigid structure 15, as well as other means of fixing (not shown) interposed between the rigid structure 15 and the structure of the aircraft.

In FIG. 1 it can be seen that the pylon 14 presents an external surface 20 which forms an aerodynamic profile which incorporates the leading edge 16, as well as a trailing edge 17 located to the rear of the rigid structure 15. Thus this external surface 20 is formed, from the front towards the rear, of the front fairing 16 which forms a leading edge, the rigid structure 15, preferably fitted with a fairing, and the rear fairing 17, which forms the trailing edge.

It should be noted that the leading edge 16, and more precisely the fairing which defines it, here take the form of a skin, possibly a double skin.

Figure 2:
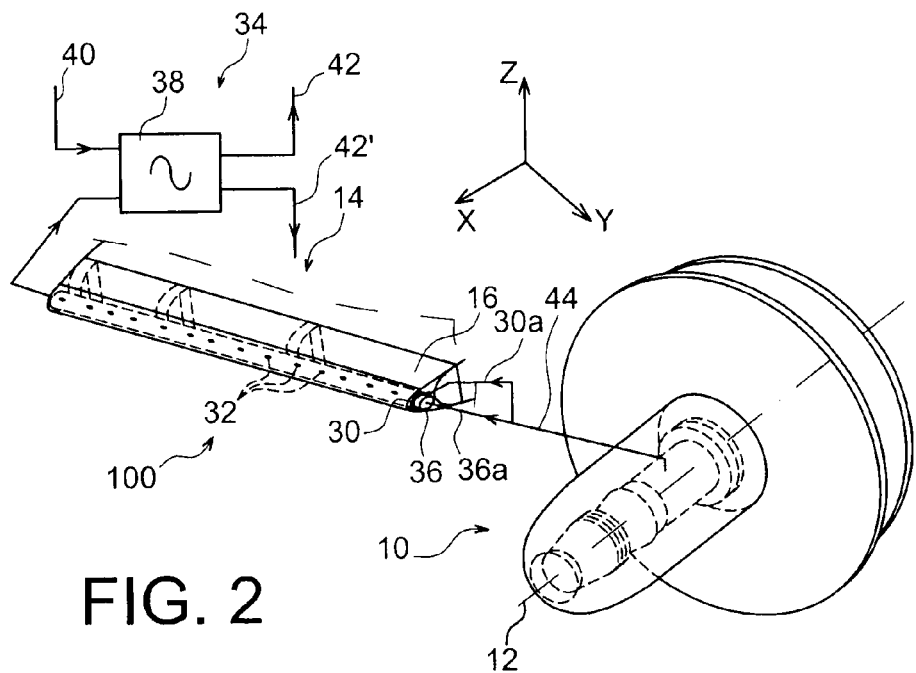
FIG. 2 shows an exploded schematic view of a part of the engine assembly fitted to the rear part of the aircraft shown in FIG. 1.

With reference now to FIG. 2 which shows one of the two engine assemblies 100 in a schematic exploded manner, it is shown that the engine assembly includes means which provide anti-icing of the leading edge 16, which essentially include a first hot air distribution channel, reference 30, which passes along this leading edge 16 and internally with reference to the leading edge. This first channel 30 is approximately cylindrical and of circular cross-section, therefore parallel to the leading edge 16, with a number of hot air distribution holes 32 made in it spaced apart from each other in the direction of the wingspan, and which are made facing the front end of the leading edge 16.

Furthermore, FIG. 2 shows a pressurised air supply system for the aircraft, reference 34. This system includes a second hot air channel 36 which also passes through the engine attachment pylon 14, along the leading edge 16. This second channel 36 supplies hot air to a heat exchanger 38 belonging to the system 34, which is also supplied by an intake of cold air drawn from outside the aircraft. In a known manner, at the outlet 42 of this system 34, connecting with the cold air intake 40, pressurisation air is supplied which is destined to be introduced to the interior of the aircraft, in particular inside the aircraft's passenger cabin. In addition, the pressure, flow and temperature are regulated at the outlet 42' of the heat exchanger which is connected to the second hot air channel.

In a known manner, this heat exchanger 38 may be housed in the structure of the aircraft.

As is shown schematically in FIG. 2, the first channel 30 is supplied with hot air by a first pipe 30a, whilst the second hot air channel 36 is supplied by a second pipe 36a, with both these pipes 30a, 36a, merging at a downstream end of a channel for drawing off hot air 44 connected to the turbo-shaft engine 10. Thus the design that is used advantageously envisages only a single channel 44 for drawing off hot air connected to the turbo-shaft engine, and which at its downstream end has a fork which allows simultaneous supply of both pipes 30a, 36a, which themselves respectively supply the first hot air distribution channel 30 which provides anti-icing, and the second hot air channel 36 which belongs to the system 34 for supplying pressurised air to the aircraft. One envisaged alternative (not shown) involves providing two draw-off channels which respectively supply the two pipes 30a, 36a. In both cases, one or more valves may be envisaged which are used to control the amount of air passing through the pipes 30a, 36a.

Figure 3:
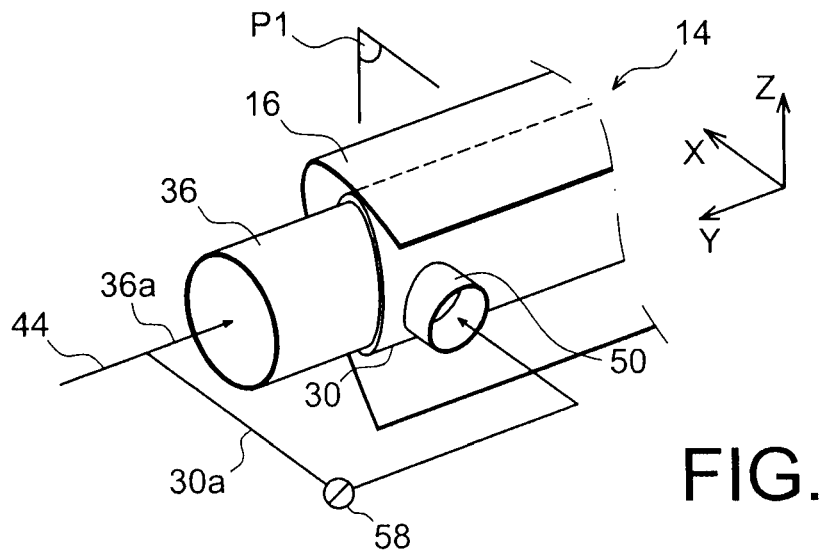
FIG. 3 shows a more detailed perspective view of the leading edge of the attachment pylon for the engine assembly shown in the previous figures.
Figure 4:
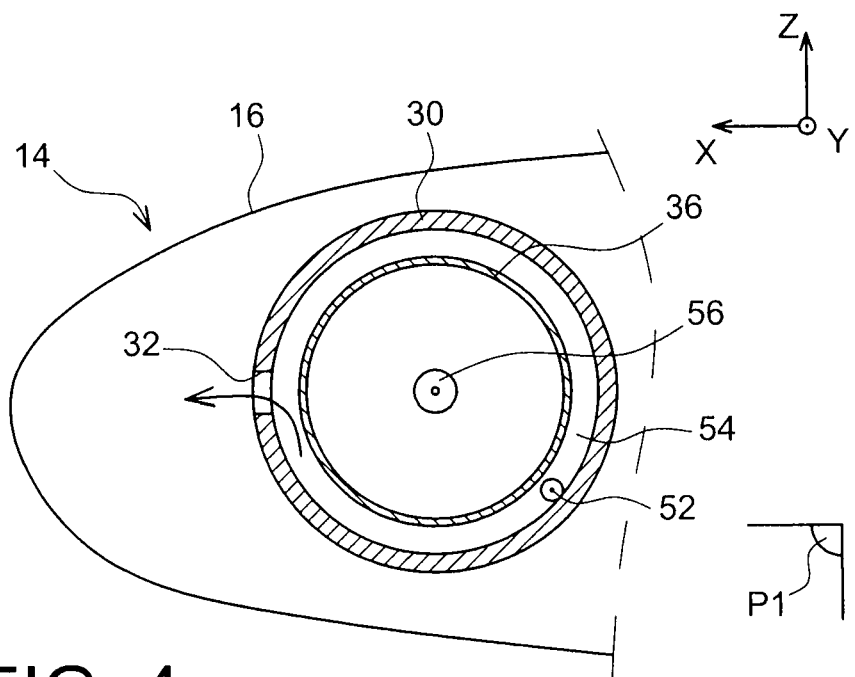
FIG. 4 shows a section view taken through plane P1 of FIG. 3.

As may be seen more clearly in FIGS. 3 and 4, one of the specific features of this invention rests in the fact that the second channel 36 is housed inside the first hot air distribution channel 30, with these two channels preferably being concentric. Thus the hot air which arrives through the pipe 30a is introduced through one or more inlets 50 into an annular space, formed between the internal wall of the first channel 30 and the external wall of the second channel 36. This flow of air 52 passing through the annular space 54 is blown in the direction of the forward end of the leading edge, inside the latter, by means of distribution holes 32 made through the first channel 30.

In parallel, the hot air from the pipe 36a is introduced into the channel 36, thus creating a flow 56 which extends through the engine attachment pylon up to the heat exchanger 38. Thus the hot air flows from the distal end of the engine attachment pylon towards the proximal end of the latter, within both channels 30, 36.

Moreover, it should be noted that one or more air outlets (not shown) made in the leading edge 16 allow the hot air leaving the distribution holes 32 to leave once this hot air has contributed to the anti-icing of this leading edge 16.

In FIG. 4 an annular space 54 is shown, deliberately magnified in relation to that preferentially used. It is in fact arranged for the second channel 36 to be inserted into the first channel 30, with the clearance allowing the one to be assembled inside the other, thus forming the annular space through which the flow 52 passes before being blown through the distribution holes 32. In other words, the second channel 36 is mechanically supported in relation to the first channel 30 by the fitting of the one inside the other, preferably without any additional fastening components.

In FIG. 3 a flow regulation valve located on the pipe 30a has been shown. This valve 58 is used to control the apportionment of hot air flows through the first and second pipes 30a, 36a. In particular, when anti-icing is not required for the leading edge 16, the valve 58 is fully closed so that all the hot air coming from the supply channel 44 is discharged into the pipe 36a which supplies the second channel 36 which belongs to the aircraft's pressurised air supply system.

Naturally, various modifications may be made by those working in this field to the invention that has just been described in the form of non-restrictive examples only.

The invention claimed is:

1. A pylon for attaching an aircraft turbo-shaft engine designed to be laterally offset on a rear part of an aircraft fuselage, said pylon comprising:
   an aerodynamic profile which includes a leading edge,
   a first hot-air distribution channel defined by a housing located internally with respect to said leading edge, said housing being distinct from said leading edge and passing along the leading edge in order to provide anti-icing of the leading edge,
   a second hot air channel belonging to a system for supplying pressurized air for the aircraft,
   wherein said second channel is housed inside said housing of said first hot-air distribution channel,
   wherein said first and second channels are each cylindrical, of circular cross-section, and are concentric.

2. A pylon according to claim 1, wherein said first hot air distribution channel defines multiple hot air distribution holes.

3. A pylon according to claim 1, wherein first and second channels are each supplied with hot air drawn off the turbo-shaft engine.

4. A pylon according to claim 3, wherein first and second channels are respectively supplied by first and second pipes which emerge from a same hot air draw-off channel.

5. A pylon according to claim 4, further including means of controlling an apportionment of hot air-flows through the first and second pipes.

6. An engine assembly for an aircraft, wherein said engine assembly includes a turbo-shaft engine as well as a pylon according to claim 1, wherein said pylon carries said turbo-shaft engine and is designed to be laterally offset on a rear part of the aircraft fuselage.

7. A rear part of an aircraft, wherein said rear part includes at least one engine assembly according to claim 6, laterally offset on the aircraft fuselage.

8. An aircraft with a rear part according to claim 7.

* * * * *